United States Patent
Todd et al.

(10) Patent No.: US 7,327,321 B2
(45) Date of Patent: Feb. 5, 2008

(54) ELECTROMAGNETIC RADIATION ASSEMBLY

(75) Inventors: Daniel R. Todd, Sheboygan, WI (US); Daniel J. Mathieu, Sheboygan Falls, WI (US); Allen A. Bukosky, Sheboygan, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 299 days.

(21) Appl. No.: 11/168,118

(22) Filed: Jun. 27, 2005

(65) Prior Publication Data

US 2006/0291225 A1 Dec. 28, 2006

(51) Int. Cl.
*H01Q 1/32* (2006.01)
*B60Q 1/26* (2006.01)

(52) U.S. Cl. .................. 343/711; 362/494; 362/492; 343/712; 343/713; 340/475

(58) Field of Classification Search .................. None
See application file for complete search history.

(56) References Cited

U.S. PATENT DOCUMENTS

| | | | |
|---|---|---|---|
| 32,576 A | 1/1861 | Pastore |
| 1,456,950 A | 5/1923 | Switch |
| 2,060,401 A | 11/1936 | Smith |
| 2,180,610 A | 11/1939 | Ritz-Woller |
| 2,190,123 A | 2/1940 | Pace |
| 2,263,382 A | 11/1941 | Gotzinger |
| 2,580,014 A | 12/1951 | Gazda |
| 2,595,331 A | 5/1952 | Calihan et al. |
| 3,040,207 A | 6/1962 | Gronikowski |
| 3,266,016 A | 8/1966 | Maruyama et al. |
| 3,280,701 A | 10/1966 | Donnelly et al. |
| 3,436,758 A | 4/1969 | Kluth |
| 3,449,626 A | 6/1969 | De Coye De Castelet |
| 3,532,871 A | 10/1970 | Shipman |
| 3,543,018 A | 11/1970 | Barcus et al. |
| 3,665,392 A | 5/1972 | Annas |
| 3,840,851 A | 10/1974 | Fowler et al. |
| 4,005,928 A | 2/1977 | Kmetz et al. |
| 4,023,029 A | 5/1977 | Fischer |
| 4,040,726 A | 8/1977 | Paca |
| 4,066,332 A | 1/1978 | Kato et al. |
| 4,158,483 A | 6/1979 | Fisher et al. |
| 4,274,078 A | 6/1981 | Isobe et al. |
| 4,299,444 A | 11/1981 | Romer |
| 4,443,057 A | 4/1984 | Bauer et al. |
| 4,463,411 A | 7/1984 | Proctor |
| 4,467,193 A | 8/1984 | Carroll |
| 4,475,100 A | 10/1984 | Duh |
| 4,479,172 A | 10/1984 | Connor |
| 4,491,390 A | 1/1985 | Tong-Shen |
| 4,499,451 A | 2/1985 | Suzuki et al. |
| 4,506,315 A | 3/1985 | Maekawa et al. |
| 4,516,197 A | 5/1985 | Yonkers |
| 4,583,155 A | 4/1986 | Hart |

(Continued)

*Primary Examiner*—Trinh Vo Dinh
(74) *Attorney, Agent, or Firm*—Wells St. John PS (57) ABSTRACT

An electromagnetic radiation assembly is described and which includes a reflector having discrete first and second surfaces; a first electromagnetic radiation emitter positioned adjacent to the first surface; and a second electromagnetic radiation emitter positioned adjacent to the second surface, and wherein, when energized, the first and second electromagnetic radiation emitters emit visibly discernible electromagnetic radiation which is reflected by the reflector in a fashion so as to be visible at locations forward of the first surface.

10 Claims, 10 Drawing Sheets

U.S. PATENT DOCUMENTS

| | | |
|---|---|---|
| 4,588,267 A | 5/1986 | Pastore |
| 4,591,954 A | 5/1986 | Kawamura et al. |
| 4,603,946 A | 8/1986 | Kato et al. |
| 4,613,791 A | 9/1986 | Kurihara et al. |
| 4,623,222 A | 11/1986 | Itoh et al. |
| 4,626,967 A | 12/1986 | Segoshi |
| 4,630,904 A | 12/1986 | Pastore |
| 4,646,210 A | 2/1987 | Skogler et al. |
| 4,659,967 A | 4/1987 | Dahl |
| 4,665,321 A | 5/1987 | Chang et al. |
| 4,701,022 A | 10/1987 | Jacob |
| 4,721,364 A | 1/1988 | Itoh et al. |
| 4,733,335 A | 3/1988 | Serizawa et al. |
| 4,733,336 A | 3/1988 | Skogler et al. |
| 4,741,603 A | 5/1988 | Miyagi et al. |
| 4,791,534 A | 12/1988 | Lindberg |
| 4,793,690 A | 12/1988 | Gahan et al. |
| 4,799,768 A | 1/1989 | Gahan |
| 4,807,096 A | 2/1989 | Skogler et al. |
| 4,841,198 A | 6/1989 | Wilhelm |
| 4,862,330 A | 8/1989 | Machida et al. |
| 4,868,459 A | 9/1989 | Dennerlein et al. |
| 4,868,719 A | 9/1989 | Kouchi et al. |
| 4,882,565 A | 11/1989 | Gallmeyer |
| 4,886,960 A | 12/1989 | Molyneux et al. |
| 4,893,063 A | 1/1990 | Pernyeszi |
| 4,916,430 A | 4/1990 | Vu et al. |
| 4,917,477 A | 4/1990 | Bechtel et al. |
| 4,929,866 A | 5/1990 | Murata et al. |
| 4,935,665 A | 6/1990 | Murata |
| 4,951,179 A | 8/1990 | Machida |
| 5,014,167 A | 5/1991 | Roberts |
| 5,029,060 A | 7/1991 | Aho et al. |
| 5,050,051 A | 9/1991 | Machida et al. |
| 5,059,015 A | 10/1991 | Tran |
| 5,066,112 A | 11/1991 | Lynam et al. |
| 5,069,535 A | 12/1991 | Baucke et al. |
| 5,072,340 A | 12/1991 | Jones |
| 5,076,673 A | 12/1991 | Lynam et al. |
| 5,093,768 A | 3/1992 | Ohe |
| 5,097,395 A | 3/1992 | Aho et al. |
| 5,115,346 A | 5/1992 | Lynam |
| 5,136,419 A | 8/1992 | Shabrang |
| 5,150,966 A | 9/1992 | Nelson |
| 5,165,772 A | 11/1992 | Wu |
| 5,174,649 A | 12/1992 | Alston |
| 5,189,537 A | 2/1993 | O'Farrell |
| 5,207,492 A | 5/1993 | Roberts |
| 5,211,466 A | 5/1993 | Jarocki et al. |
| 5,241,457 A | 8/1993 | Sasajima et al. |
| 5,253,109 A | 10/1993 | O'Farrell |
| 5,272,602 A | 12/1993 | Sasajima et al. |
| 5,285,060 A | 2/1994 | Larson et al. |
| 5,303,130 A | 4/1994 | Wei et al. |
| 5,313,335 A | 5/1994 | Gray et al. |
| 5,336,448 A | 8/1994 | Byker |
| 5,355,284 A | 10/1994 | Roberts |
| 5,361,190 A | 11/1994 | Roberts et al. |
| 5,371,659 A | 12/1994 | Pastrick et al. |
| 5,388,035 A | 2/1995 | Bodem, Jr. |
| 5,402,103 A | 3/1995 | Tashiro |
| 5,404,869 A | 4/1995 | Parkyn, Jr. et al. |
| 5,416,313 A | 5/1995 | Larson et al. |
| 5,436,741 A | 7/1995 | Crandall |
| 5,436,809 A | 7/1995 | Brassier et al. |
| 5,438,487 A | 8/1995 | Schmid et al. |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,504,478 A | 4/1996 | Knapp |
| 5,528,422 A | 6/1996 | Roberts |
| 5,530,240 A | 6/1996 | Larson et al. |
| 5,575,552 A | 11/1996 | Faloon |
| 5,587,699 A | 12/1996 | Faloon et al. |
| 5,619,374 A | 4/1997 | Roberts |
| 5,619,375 A | 4/1997 | Roberts |
| 5,660,457 A | 8/1997 | Lyons |
| 5,668,663 A | 9/1997 | Varaprasad et al. |
| 5,669,704 A | 9/1997 | Pastrick |
| 5,669,705 A | 9/1997 | Pastrick et al. |
| 5,724,187 A | 3/1998 | Varaprasad et al. |
| D394,833 S | 6/1998 | Muth |
| 5,760,962 A | 6/1998 | Schofield et al. |
| 5,788,357 A | 8/1998 | Muth et al. |
| 5,818,625 A | 10/1998 | Forgette et al. |
| 5,825,527 A | 10/1998 | Forgette et al. |
| 5,863,116 A | 1/1999 | Pastrick et al. |
| 5,879,074 A | 3/1999 | Pastrick |
| 5,889,608 A | 3/1999 | Buffat et al. |
| D409,540 S | 5/1999 | Muth |
| 5,938,320 A | 8/1999 | Crandall |
| 5,959,367 A | 9/1999 | O'Farrell et al. |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| D426,506 S | 6/2000 | Todd et al. |
| D426,507 S | 6/2000 | Todd et al. |
| D427,128 S | 6/2000 | Mathieu |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,111,684 A | 8/2000 | Forgette et al. |
| 6,142,656 A | 11/2000 | Kurth |
| 6,163,083 A | 12/2000 | Kramer et al. |
| 6,166,848 A | 12/2000 | Cammenga et al. |
| 6,175,164 B1 | 1/2001 | O'Farrell et al. |
| 6,176,602 B1 | 1/2001 | Pastrick et al. |
| 6,257,746 B1 | 7/2001 | Todd et al. |
| 6,356,376 B1 | 3/2002 | Tonar et al. |
| 6,441,943 B1 | 8/2002 | Roberts et al. |
| 6,512,624 B2 | 1/2003 | Tonar et al. |
| 6,650,457 B2 | 11/2003 | Busscher |
| 6,657,767 B2 | 12/2003 | Bonardi |
| 6,749,325 B2 * | 6/2004 | Bukosky et al. ............ 362/494 |
| 6,918,685 B2 * | 7/2005 | Bukosky et al. ............ 362/301 |
| 7,008,091 B2 * | 3/2006 | Mathleu et al. ............ 362/494 |
| 7,104,676 B2 * | 9/2006 | Bukosky et al. ............ 362/494 |
| 7,241,037 B2 * | 7/2007 | Mathieu et al. ............ 362/494 |
| 2004/0114384 A1 | 6/2004 | Carter et al. |
| 2004/0145902 A1 * | 7/2004 | Todd et al. ................. 362/494 |
| 2007/0153536 A1 * | 7/2007 | Mathieu ..................... 362/494 |

* cited by examiner

ELECTROMAGNETIC RADIATION ASSEMBLY

TECHNICAL FIELD

The present invention relates to an electromagnetic radiation assembly, and more specifically to an assembly which may operate as a combined warning lamp and rearview mirror and which is operable to illuminate regions adjacent to the overland vehicle and which assists in the safe operation of the overland vehicle as by signaling adjacent vehicles of the intention of the operator to change the direction of the overland vehicle; to assist the operator in entering or departing the vehicle during reduced periods of visibility; and further to provide information of interest, to the operator of the overland vehicle.

BACKGROUND OF THE INVENTION

The prior art is replete with numerous examples of various auxiliary signaling assemblies which have been employed for various purposes on overland vehicles of assorted designs. As a general matter, these auxiliary signaling assemblies have utilized assorted semitransparent mirrors including dichroic and electrochromic type mirrors as well as neutrally chromatic mirrors which have been modified, in various fashions, so as to be rendered semitransparent.

In addition to the use of various semitransparent mirrors, assorted mirror housing modifications have been made which have added operational features to these same signaling assemblies. The modifications have included such things as exterior lamps which have been useful for illuminating the side of the vehicle, or the underlying earth beside the vehicle, in order to provide assistance to an operator when they are leaving or entering the vehicle during reduced periods of visibility. Auxiliary signaling assemblies such as found in U.S. Pat. Nos. 5,014,167; 6,005,724; and 6,076,948 for example have found wide acceptance and are now found on various overland vehicles including passenger cars, sport utility vehicles, trucks, and motorcycles.

In view of the increased commercial acceptance of such devices, designers have increasingly focused on both interior and exterior mirrors as regions in which various warning lamps or indicators may be located so as to provide periodic information to the operator regarding the operational condition of the overland vehicle, or other conditions such as ambient environmental conditions which could effect the safe operation of the overland vehicle. Such warning lamps and indicators have provided such information as tire pressure, temperature, and proximity to fixed objects which may be impacted when the vehicle is being operated in reverse, for example.

While the various auxiliary signaling assemblies and mirrors, as referenced above, have operated with a great deal of success, there have been shortcomings which have detracted from their individual usefulness. For example, many of the prior art designs are quite complex. For example, several of the prior art auxiliary signaling assemblies which have been utilized heretofore have resulted in an increase in the size of the exterior mirror housing in order to accommodate the auxiliary signaling lamps. In other arrangements, the addition of the auxiliary signaling assemblies has resulted in an increase in the complexity of the electrical conduits that are necessary to provide electrical power to the various assemblies in the mirror. Various solutions have been suggested to this problem including integrating various electrical conduits into preexisting mirror assembly components such as heaters or the like. Notwithstanding these efforts, the space remaining within a mirror housing is quite limited. With the continued emphasis on providing increased features which are available to the operator from the rear and side view mirrors, problems begin to arise with respect to the dissipation of heat energy generated as a result of the energizing of various light emitting diodes which are utilized to provide the visibly discernable light which can be discerned by the operator of the overland vehicle. Failure to dissipate excessive amounts of this heat energy can result in a shortened operational lifetime for these same assemblies.

In the present invention, the inventors have departed from the teachings of the prior art by providing an electromagnetic radiation assembly which can achieve all the benefits provided by the previous prior art assemblies while avoiding many of the shortcomings associated therewith.

These and other aspects of the present invention will be discussed in greater detail hereinafter.

SUMMARY OF THE INVENTION

Therefore, one aspect of the present invention relates to an electromagnetic radiation assembly which includes a reflector having distinct first and second surfaces, and first and second portions; a first electromagnetic radiation emitter positioned adjacent to the first surface, and which, when energized, emits visibly discernible electromagnetic radiation which is reflected by the first portion of the reflector so as to be visible at locations forward of the first surface; and a second electromagnetic radiation emitter positioned adjacent to the second surface of the reflector, and which, when energized, emits visibly discernible electromagnetic radiation which is reflected by the second portion of the reflector so as to be visible at locations forward of the first surface.

Another aspect of the present invention relates to a electromagnetic radiation assembly which includes a first supporting substrate having distinct first and second surfaces, and which defines, at least in part, an aperture which permits visibly discernible electromagnetic radiation to pass therethrough; a first electromagnetic radiation emitter positioned on the second surface of the first supporting substrate, and near the aperture; a reflector having a first and second portion, and wherein the first portion is oriented in reflecting relation relative to the first electromagnetic radiation emitter, and which reflects, at least in part, electromagnetic radiation which is emitted by first electromagnetic radiation emitter through the aperture such that the emitted electromagnetic radiation may be detected at locations forward of the first surface of the first supporting substrate; a second electromagnetic radiation emitter positioned in spaced relation relative to the first supporting substrate, and wherein the reflector is positioned therebetween the second electromagnetic radiation emitter, and the first supporting substrate, and wherein the second portion of the reflector reflects, at least in part, electromagnetic radiation which is emitted by the second electromagnetic radiation emitter through the aperture such that the emitted electromagnetic radiation may be detected at locations forward of the first supporting substrate.

Still another aspect of the present invention relates to an electromagnetic radiation assembly which includes a first supporting substrate having first and second surfaces, and which defines, at least in part, an aperture which passes visibly discernible light therethrough; a first electromagnetic radiation emitter borne by the second surface, and which, when energized, emits visibly discernible light; a reflector having a first portion which defines, at least in part, a reflector pocket which is disposed in substantially covering, eccentric reflecting relation relative to the first electromagnetic radiation emitter, and a second portion, and wherein the visibly discernible light emitted by the first electromagnetic radiation emitter is reflected, at least in part, by the reflector pocket, and subsequently passes through the aperture of the first supporting substrate such that it can be seen from a location forward of the first surface of the first supporting substrate; a second substrate positioned in spaced relation relative to the reflector, and wherein the reflector is positioned therebetween the first and second supporting substrates; and a second electromagnetic radiation emitter borne by the second substrate, and which, when energized, emits visibly discernible light which is reflected by the second portion of the reflector, and which passes through the aperture of the first supporting substrate such that it can be seen from a location forward of the first surface of the first supporting substrate.

Yet still further, another aspect of the present invention relates to an electromagnetic radiation assembly which includes a first supporting substrate having first and second surfaces, and which further has a region through which an electromagnetic radiation signal may pass; a first plurality of electromagnetic radiation emitters borne by the second surface, and positioned adjacent to the region through which an electromagnetic radiation signal may pass, and wherein the first plurality of electromagnetic radiation emitters, when energized, emits electromagnetic radiation which forms a first electromagnetic radiation signal; a reflector having a plurality of reflector pockets which are individually positioned in covering, eccentric reflecting relation relative to each of the first plurality of electromagnetic radiation emitters, and wherein the reflector further includes a region thorough which a second electromagnetic radiation signal may pass, and wherein the first electromagnetic radiation signal generated by the first plurality of electromagnetic radiation emitters is reflected by the respective reflector pockets in a direction so as to substantially pass through the region in the first supporting substrate which passes the first electromagnetic radiation signal; a second supporting substrate having first and second surfaces, and which is positioned in spaced relation relative to the reflector, and wherein the reflector is positioned therebetween the first and second supporting surfaces; and a second plurality of electromagnetic radiation emitters borne by the second supporting substrate and which, when energized, emits electromagnetic radiation which forms a second electromagnetic radiation signal, and wherein the second electromagnetic radiation signal passes through both the region of the reflector which passes the second electromagnetic radiation signal, and the region of the first supporting substrate which permits the passage of the first electromagnetic radiation signal.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
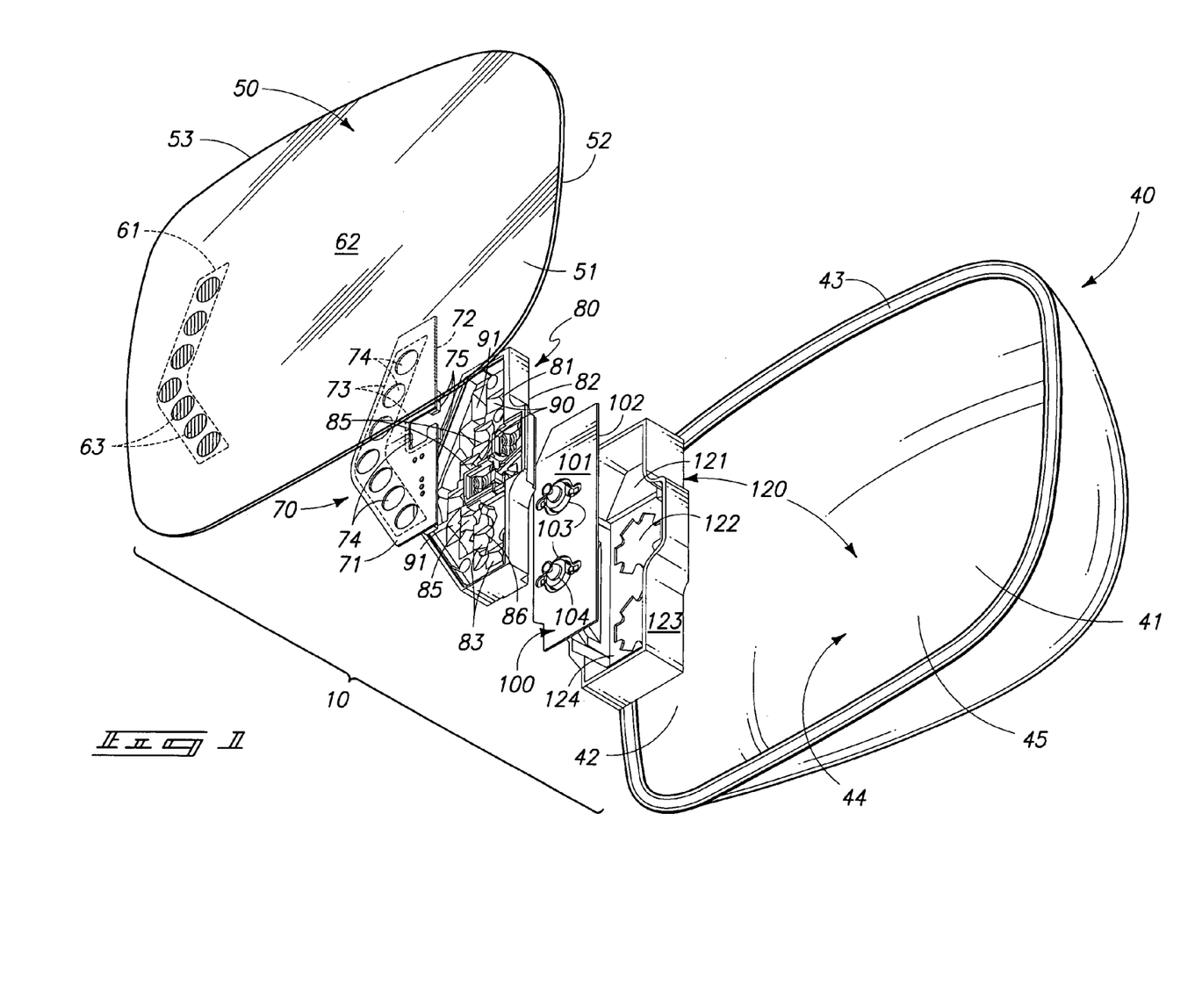
FIG. 1 is a greatly simplified, perspective exploded view of one form of the electromagnetic radiation assembly of the present invention.
Figure 8A:
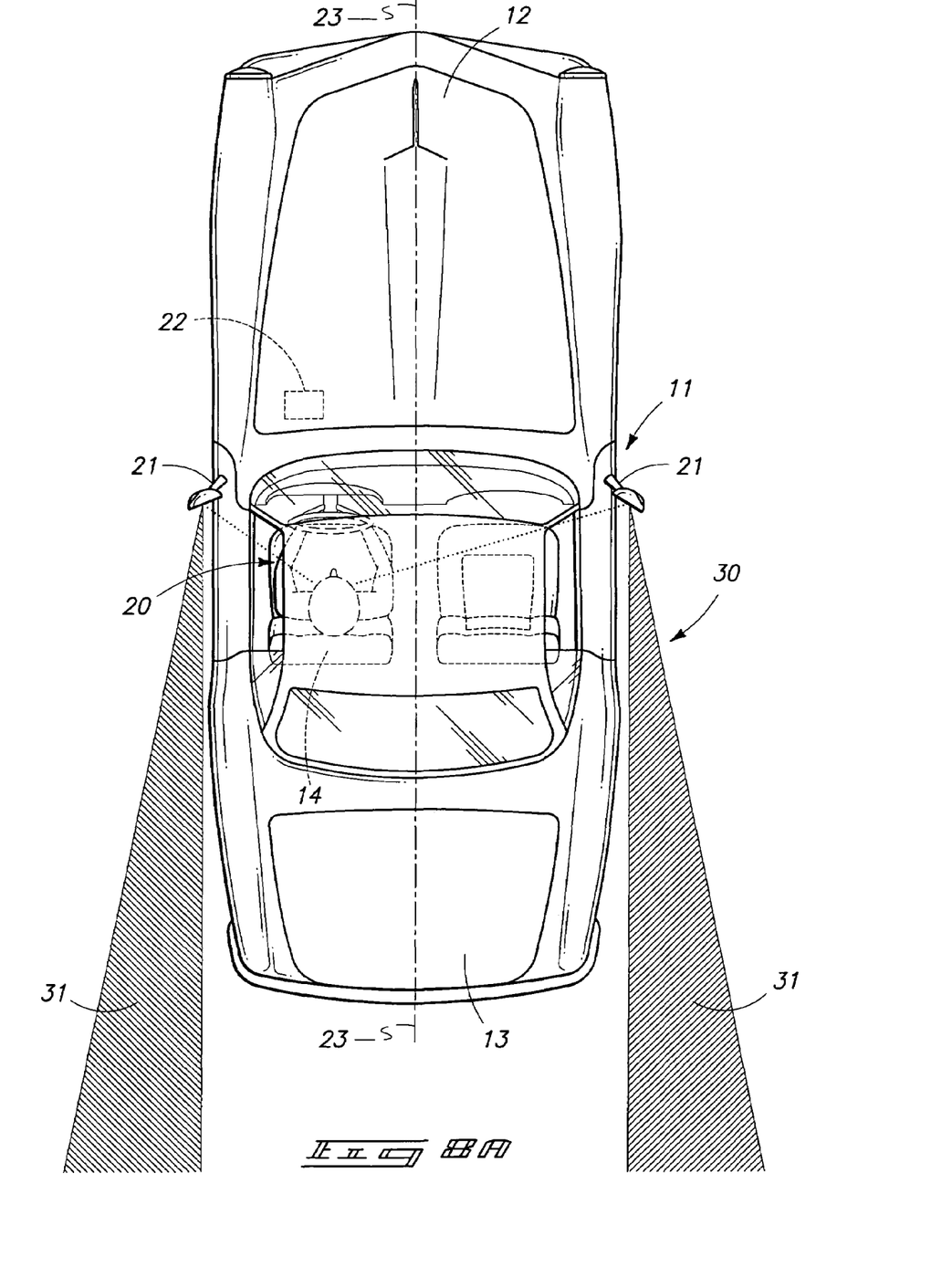
FIGS. 8A, B and C are greatly simplified, schematic views of the pattern of visibly discernable electromagnetic radiation emitted by the first and second forms of the invention during their various modes of operation.
Figure 8B:
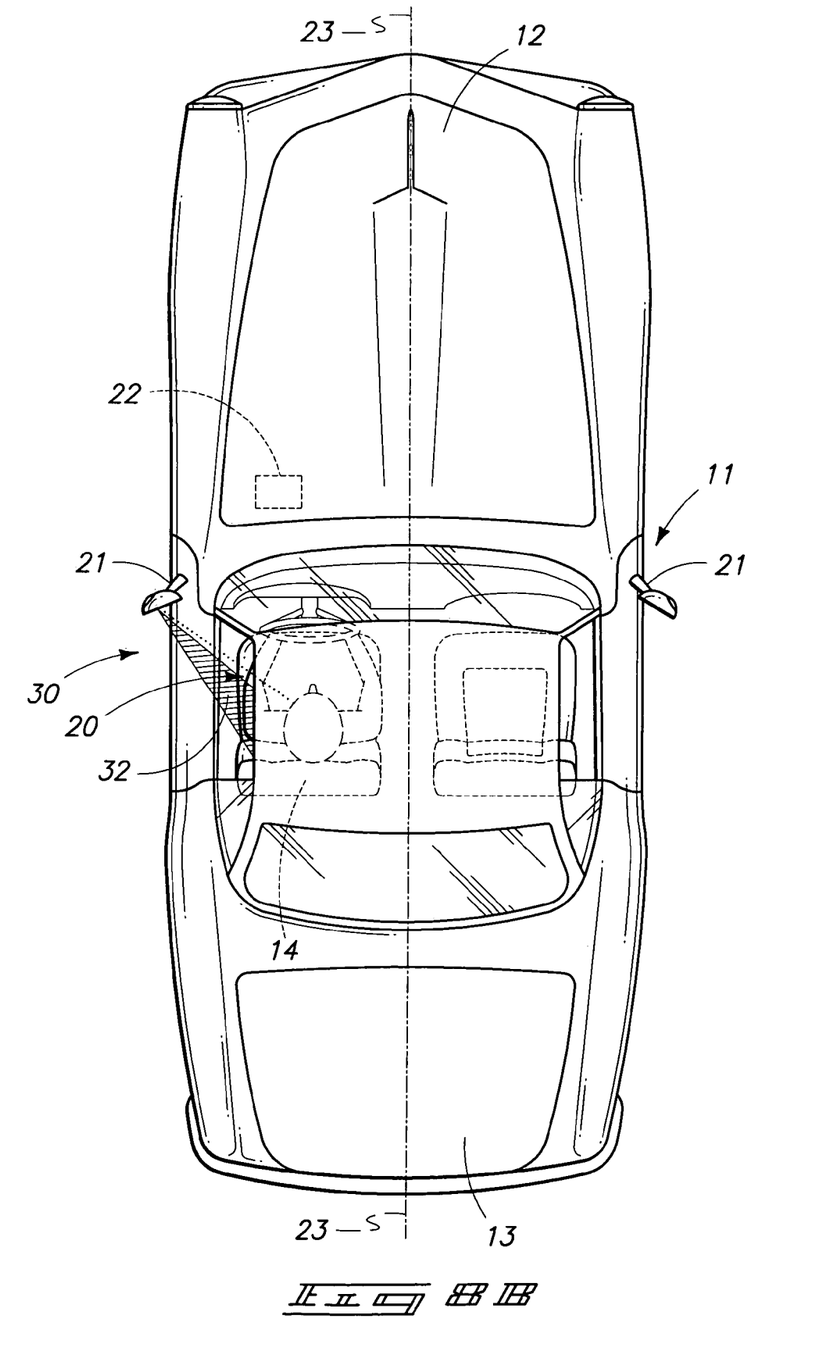
Figure 8C:
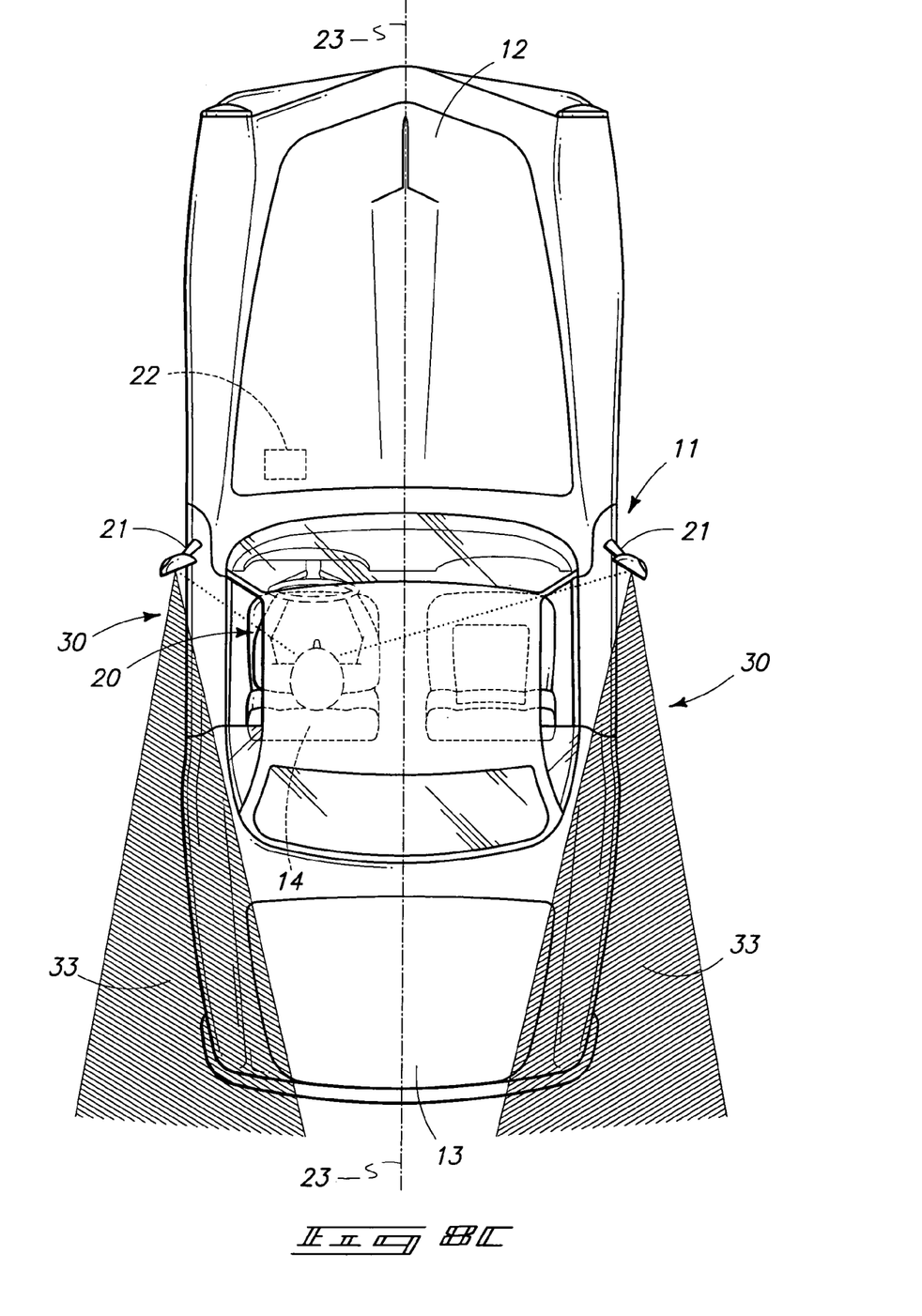

Referring more particularly to the drawings, the electromagnetic radiation assembly of the present invention is generally indicated by the numeral 10 in FIG. 1 and following. For illustrative convenience the electromagnetic radiation assembly 10 of the present invention, and which is shown and described herein, is discussed as it would be configured if it were installed on an overland vehicle 11 of conventional design and which is best seen by reference to FIG. 8. As discussed in many of the earlier prior art patents, the electromagnetic radiation assembly (hereinafter referred to as assembly 10) of the present invention operates as a combination rearview mirror, and visual signaling device, and wherein the visual signaling device provides a visual signal or pattern of illumination which is capable of being perceived from various locations which are located in assorted different directions which are laterally outwardly, inwardly, and rearwardly of the overland vehicle, when the invention is operating in its several operational modes. As will be discussed in greater detail hereinafter, the present assembly 10 is operable to generate visibly discernable electromagnetic radiation which can be seen as illustrated in FIG. 8A at locations laterally outwardly relative to the overland vehicle 11; laterally inwardly relative to the overland vehicle as seen in FIG. 8B; and rearwardly and downwardly as seen in FIG. 8C. Other emission patterns are also possible. These various modes of operation of the assembly 10 will be discussed in greater detail hereinafter.

As seen in FIG. 8, the present invention 10 is mounted on an overland vehicle 11 of conventional design. The overland vehicle 11 has a front or forward portion 12, and a rearward portion 13. The overland vehicle 11 further has a passenger compartment 14 where an operator of the overland vehicle is seated. Still further, the overland vehicle includes exterior locations 21 for a pair of exterior rearview mirrors which incorporate the present invention and which are best understood by a study of FIGS. 1 and 7, respectively. These forms of the invention will be discussed in greater detail below. As should be understood, the overland vehicle 11 also has a hand operated directional signaling switch; and foot brake (not shown), and which when utilized, provides an electrical signal which may alert drivers of other vehicles in the immediate vicinity that the overland vehicle 11 is about to change directions, turn, change lanes, etc. Yet further, other signals or warning icons may also be provided, and which can be viewed from the overland vehicle and which will alert the operator of various conditions existing on the overland vehicle, or outside ambient environmental conditions which may effect the safe operation of the overland vehicle. In addition to the foregoing, the overland vehicle 11 may be equipped with a radio frequency receiver 22 and which receives an RF signal which is transmitted from a key fob held by the operator of the overland vehicle (not shown). This RF signal, once received, is effective to unlock the various doors of the overland vehicle and further is useful in actuating the operation of the assembly 10 in one of its several modes of operation, as will be discussed below.

As best illustrated in FIG. 8, an operator of an overland vehicle 11 when positioned in the operator's position 20 has a field of view which extends approximately 180° from the operator's position towards the forward portion 12 of the vehicle. Further, and by using a pair of the assemblies 10 which are individually located at the positions 21 on the exterior portion of the overland vehicle 11, the operator may, by looking along given lines of sight, view rearwardly of the vehicle along the driver's side, passenger side, and substantially along a longitudinal axis 23 of the overland vehicle 11 when the operator views an interior rearview mirror, which is not shown. As depicted in FIGS. 8A, B and C, the assembly 10 of the present invention, when energized, provides a plurality of illumination zones which are generally indicated by the numeral 30. These illumination zones include a first illumination zone 31 (FIG. 8A) which provides visibly discernable electromagnetic radiation which is visible at positions which are laterally, outwardly relative to the intended direction of travel of the overland vehicle 11. This first illumination zone is designed to direct visibly discernable electromagnetic radiation at vehicles traveling rearwardly and in adjacent lanes relative to the overland vehicle 11 when the apparatus is operating in a first mode. Still further, the second illumination zone 32 provides visibly discernable electromagnetic radiation which is oriented substantially laterally, inwardly relative to the direction of movement of the overland vehicle, and which can be perceived by the operator of same when the apparatus is operating in a second mode. Typically, this second illumination zone is employed to transmit information of interest to the operator of the overland vehicle 11 regarding the operational conditions of the overland vehicle 11 as well as other information which may be of interest in the safe operation of the overland vehicle 11. Still further, the assembly 10, when energized, provides a third illumination zone 33 which is oriented substantially laterally inwardly, and downwardly towards the face of the earth when the apparatus is operating in a third mode. The third illumination zone is utilized typically for purposes of illuminating the side and region adjacent to the overland vehicle during periods of reduced visibility in order for an operator to safely enter or exit the overland vehicle. These various illumination zones will be discussed in greater detail hereinafter.

Referring now to FIG. 1, the first form of the assembly 10 of the present invention is incorporated into a mirror housing which is generally indicated by the numeral 40, and which is typically mounted at the mirror locations 21 on the exterior surface of the overland vehicle 11. The mirror housing or enclosure has a rear wall 41, and a sidewall 42 extends outwardly therefrom. The sidewall 42 has a peripheral edge 43 and which defines an aperture 44 having given dimensions. The rear wall 41, and sidewall 42 further defines a cavity 45 which receives and encloses the assembly 10, and other associated devices such as a movable bezel, which is not shown. As should be understood, the bezel may also include a cavity which matingly receives, at least in part, the assembly 10. The bezel movably supports the assembly 10 within the housing 40. The assembly 10 can be positionally adjusted either manually, or remotely, by an actuator (not shown) to a given angular orientation relative to the various lines of sight utilized by the operator (not shown) of the overland vehicle 11. This movement of the assembly provides a means by which the operator may adjust his given field of view rearwardly of the overland vehicle 11.

Figure 7:
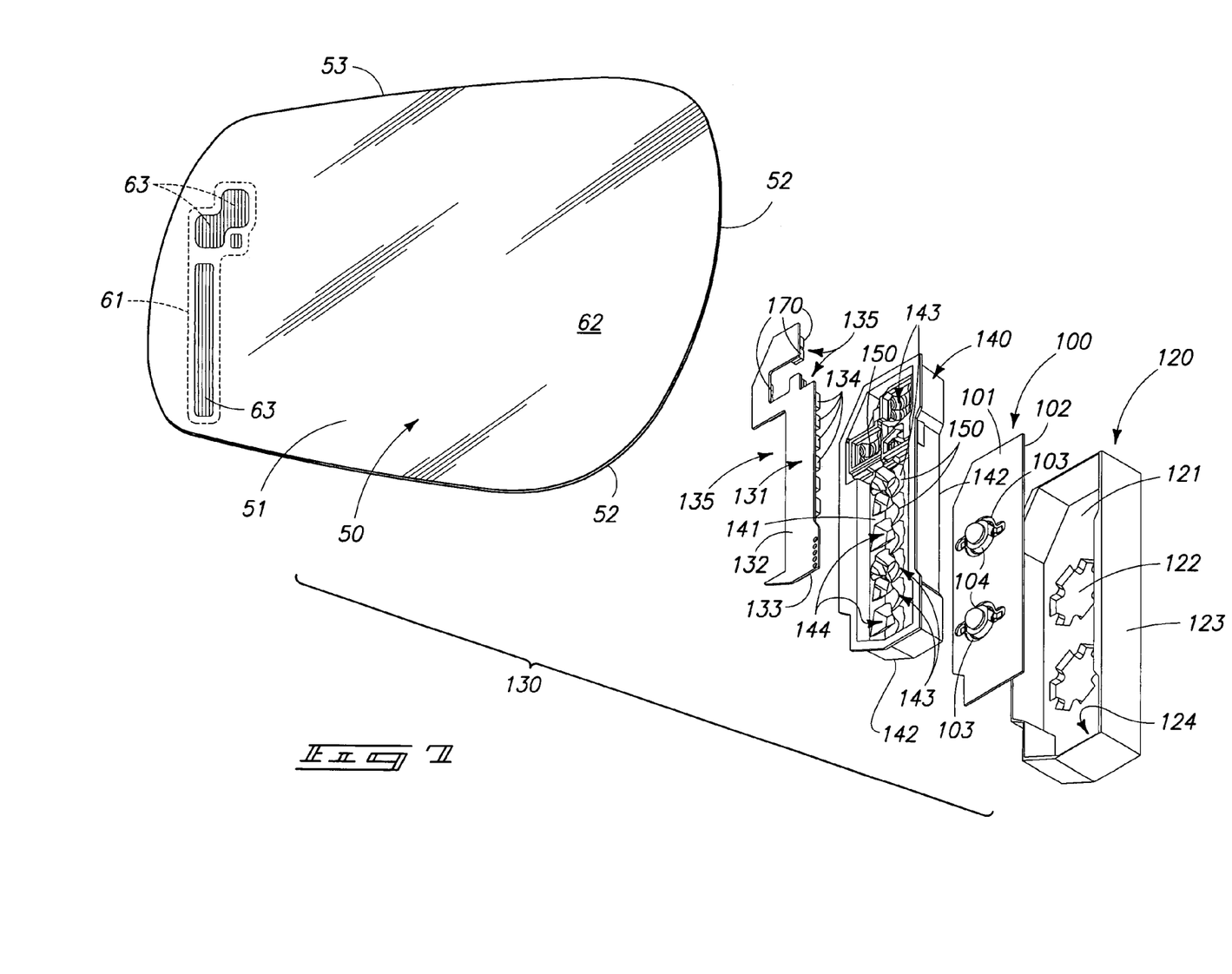
FIG. 7 is a greatly simplified, perspective, exploded view of the second form of the electromagnetic radiation assembly of the present invention.

The assembly 10 of the present invention, as seen in FIG. 1 and following, includes a semitransparent substrate which is generally indicated by the numeral 50, and which has a front, first or outside facing surface 51, and an opposite, second or rearwardly facing surface 52. In automotive applications, the semitransparent substrate is a semitransparent mirror which is selected from the group of semitransparent mirrors comprising substantially neutrally chromatic; dichroic; electrochromic and/or combinations thereof. The semitransparent substrate or mirror 50 further is defined by a peripheral edge 53, which substantially corresponds in shape and in size to the aperture 44 which is defined by the peripheral edge 43 of the housing 40. When assembled, the semitransparent mirror or substrate 50 substantially occludes the aperture 44. The semitransparent substrate or mirror 50 of the present invention may take on several forms. As seen in FIGS. 1 and 7, the semitransparent substrate or mirror typically comprises a substantially transparent or translucent substrate which has a highly reflective coating applied thereto. As should be understood, the reflective coating may be applied, either, on the one hand, to the first or outside facing surface 51, or in the alternative, and more typically to the opposite, second or rearwardly facing surface 52. The highly reflective coating may comprise any number of different highly reflective or mirror like coatings or substances such as chromium and the like, and which may be applied or formed in a manner which provides a commercially acceptable reflective surface. Still further, other coatings may be applied, for example, to the opposite rearwardly facing surface 52 such as masking layers and the like and which render the semitransparent substrate or mirror substantially opaque. For automotive applications, the resulting reflectance of the semitransparent mirror or substrate 50 should be generally, on average, greater than about 35%. However, in other commercial applications, increased or decreased reflectance may be acceptable depending upon the end use of the assembly 10.

As best seen in FIGS. 1 and 7, for example, the semitransparent substrate or mirror 50 has a first, or primary region 61, and through which a visibly discernable electromagnetic radiation signal may pass; and an adjacent secondary region 62. While only two regions are shown and discussed herein, it is of course possible to have a plurality of secondary regions depending upon the end use of the assembly 10. These secondary regions may be adjacent to each other, or may be spaced at a distance and positioned at various locations about the semitransparent substrate or mirror 50. As a general matter, however, the first or primary region 61 passes a portion of the visibly discernable electromagnetic radiation directed at same while simultaneously reflecting a given percentage of the visibly discernable electromagnetic radiation or light which comes from the ambient environment. On the other hand, the secondary region 62 is operable to reflect ambient visibly discernable electromagnetic radiation and is otherwise considered nominally opaque. Depending upon the reflective or other masking layers which are applied to the opposite, rearwardly facing surface 52, the secondary region 62 may be considered completely opaque. As discussed above, the combined average reflectance of the overall surface area of the semitransparent substrate or mirror 50, including both the primary and secondary regions, is typically greater than about 35% when the assembly 10 is being employed for automotive applications, as noted above. In other industrial applications, the average reflectance may be lower or higher depending upon the desired end use. As seen in the drawings, the secondary region 62 is substantially continuous and reflects for automotive applications greater than about 35% of the ambient, visible, electromagnetic radiation, and which strikes the first outside facing surface 51 thereof. Typically, in most automotive applications, the secondary region 62, on average, passes less than about 10% of the ambient visibly discernable electromagnetic radiation. The first or primary region 61, on the other hand, passes less than about 50% of visible electromagnetic radiation, and further reflects on average, less than about 40% of visible electromagnetic radiation. The ranges noted above have been found suitable for automotive applications, however, it will be recognized that other broadened or narrowed ranges may be useful for other industrial applications.

As seen in FIG. 1, the semitransparent mirror 50 includes a plurality of discrete apertures or regions 63 which may be formed in a given pattern, and in various densities in the reflective coating, and which facilitates the passage of visibly discernable electromagnetic radiation therethrough. With respect to the semitransparent mirror or substrate 50, the first or primary region 61 may be formed by a number of different means including providing reduced thickness areas in the associated reflective coating which is provided. These reduced thickness areas in the mirror coating allow increased amounts of visibly discernable electromagnetic radiation to pass therethrough in relative comparison to the adjacent thicker areas in the secondary region 62. Further, the secondary region, as earlier discussed, may be coated with an opaque masking layer which substantially inhibits visibly discernable electromagnetic radiation from passing therethrough. Still further, the semitransparent mirror or substrate 50 may have a dichroic mirror coating applied thereto. The usefulness of dichroic mirror coatings of various types have been discussed in various U.S. Patents including U.S. Pat. Nos. 5,014,167 and 5,207,492 to name but a few. These dichroic mirror coatings are well known in the art, and further discussion regarding the nature and operation of these respective mirror coatings is not warranted. In connection with such dichroic mirror coatings, a substantially opaque masking layer, as earlier discussed, may be applied over the secondary region 62 thereby making the secondary region substantially opaque and further permitting visible electromagnetic radiation to pass through the first or primary region 61 which is unmasked. As discussed in the earlier prior art patents, the dichroic mirror coating which is applied to the semitransparent mirror or substrate 50 may be selected to pass given bands of visibly discernable electromagnetic radiation or light in greater amounts than other bands of electromagnetic radiation thereby making the resulting semitransparent mirror or substrate 50, on average, an acceptable reflector of visibly discernable electromagnetic radiation while simultaneously allowing increased amounts of visibly discernable electromagnetic radiation of the selected band of electromagnetic radiation to pass therethrough. In addition to the foregoing, another acceptable semitransparent mirror or substrate 50 may include an electrochromic mirror of a construction similar to that seen in U.S. Pat. Nos. 6,257,746; and 6,512,624 the teachings of which are incorporated by reference herein. In view of these teachings, an electrochromic mirror may be useful in the practice of the present invention 10 as will be discussed in greater detail below. It is also possible to provide combined substrates 50 depending upon the end use of the assembly.

Figure 2:
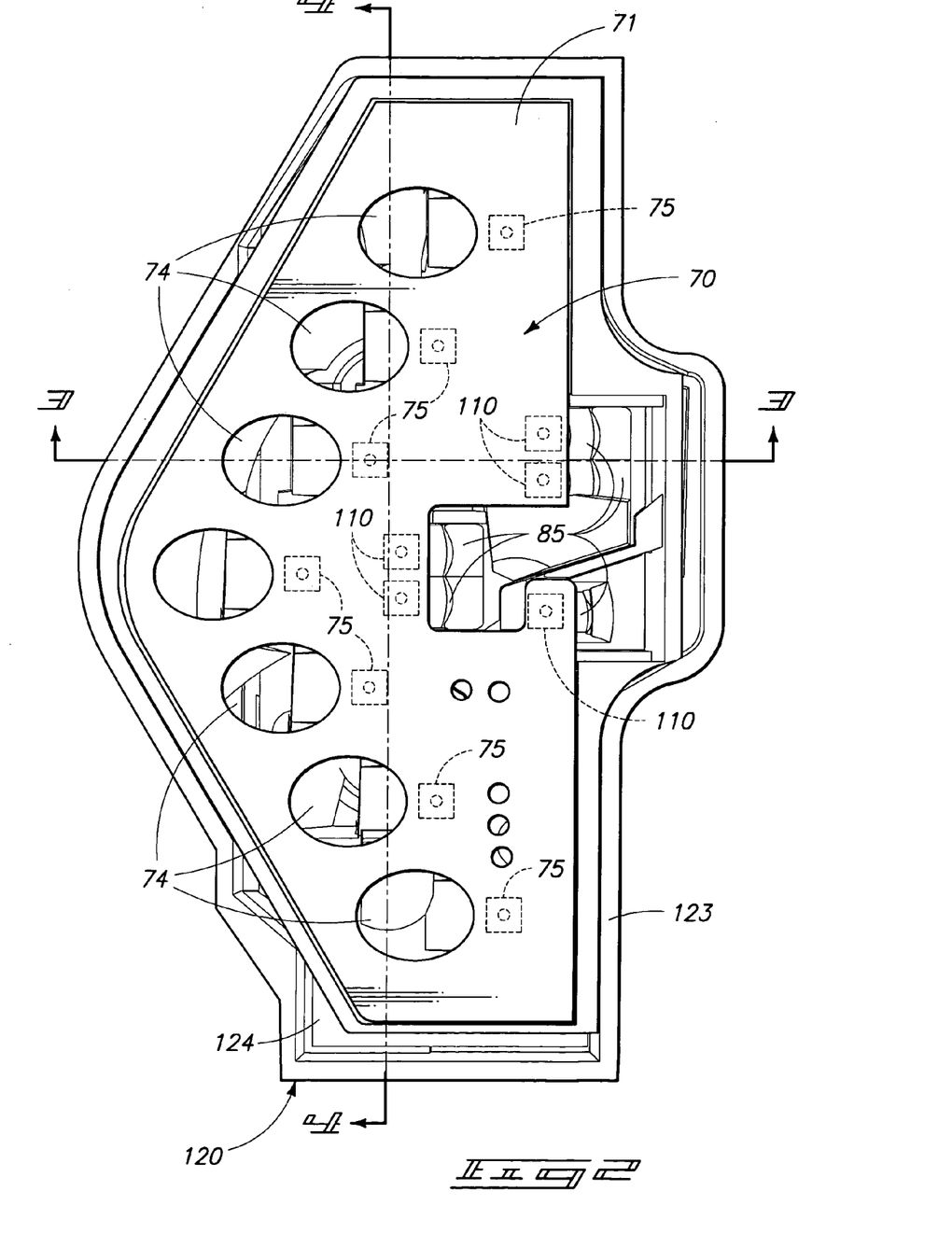
FIG. 2 is a partial, plan view of the electromagnetic radiation assembly of the present invention with a semi-transparent substrate thereof removed to show the structure thereunder.
Figure 5:
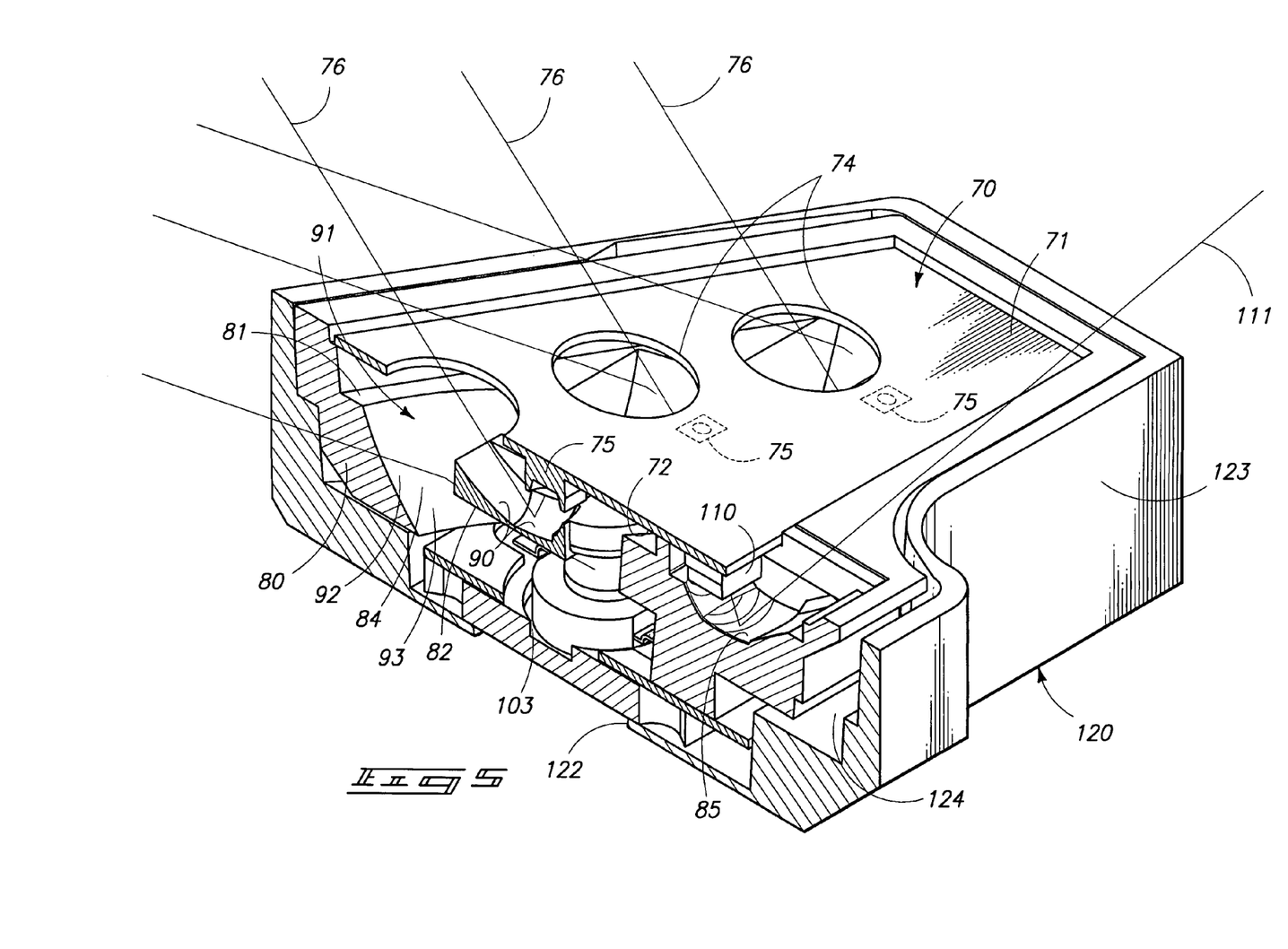
FIG. 5 is a perspective transverse, vertical, sectional view of the electromagnetic radiation assembly of the present invention and which is again taken from a position along line 3-3 of FIG. 2.

Referring now to FIG. 1, and following, the assembly 10 of the present invention includes a first substantially opaque substrate which is generally indicated by the numeral 70. The first opaque substrate operates, at least in part, as a circuit board in order to mount a plurality of electromagnetic radiation emitters which will be discussed below. The first substrate 70 has a first surface 71, which is typically juxtaposed relative to the second or rearwardly facing surface 52 of the semitransparent mirror 50. The first substrate 70 has a distinct second surface 72. Still further, the first substrate 70 defines, at least in part, one region 73 (FIG. 1), although a plurality of regions may be defined, and through which visibly discernable electromagnetic radiation may pass. As seen, the region through which the electromagnetic radiation may pass 73 may include a plurality of apertures 74 which are formed in the first substrate 70 and which extend therethrough. The apertures 74 are positioned in a predetermined pattern in order to provide a resulting visual signal which may be viewed and understood by others at a distance relative to the overland vehicle 11. As seen in FIGS. 1 and 2, the first substantially opaque substrate 70 mounts on the second surface 72 thereof, a first plurality of electromagnetic radiation emitters 75. The second surface 72 also mounts electrically conductive passageways (not shown), and which electrically couple the respective electromagnetic radiation emitters 75 with a source of electrical power which is typically provided by the overland vehicle 11. As should be understood, the first plurality of electromagnetic radiation emitters 75, when energized, emit visibly discernable electromagnetic radiation which travels along a path which is generally indicated by the numeral 76 (FIGS. 3 and 5), and which forms the first illumination zone 31, as seen in FIG. 8A. As seen in FIG. 1, it will be understood that the first plurality of electromagnetic radiation emitters are mounted on the second surface 72 of the first opaque substrate 70, and near the region 73 which passes the visibly discernable electromagnetic radiation. As illustrated in FIG. 1, the individual electromagnetic radiation emitters are typically associated with the individual apertures 74 which are formed in the first opaque substrate 70. While the discussion above was directed to visibly discernable electromagnetic radiation, it is possible by means of the present invention to emit electromagnetic radiation which is not visible and which would be useful in other applications.

Figure 3:
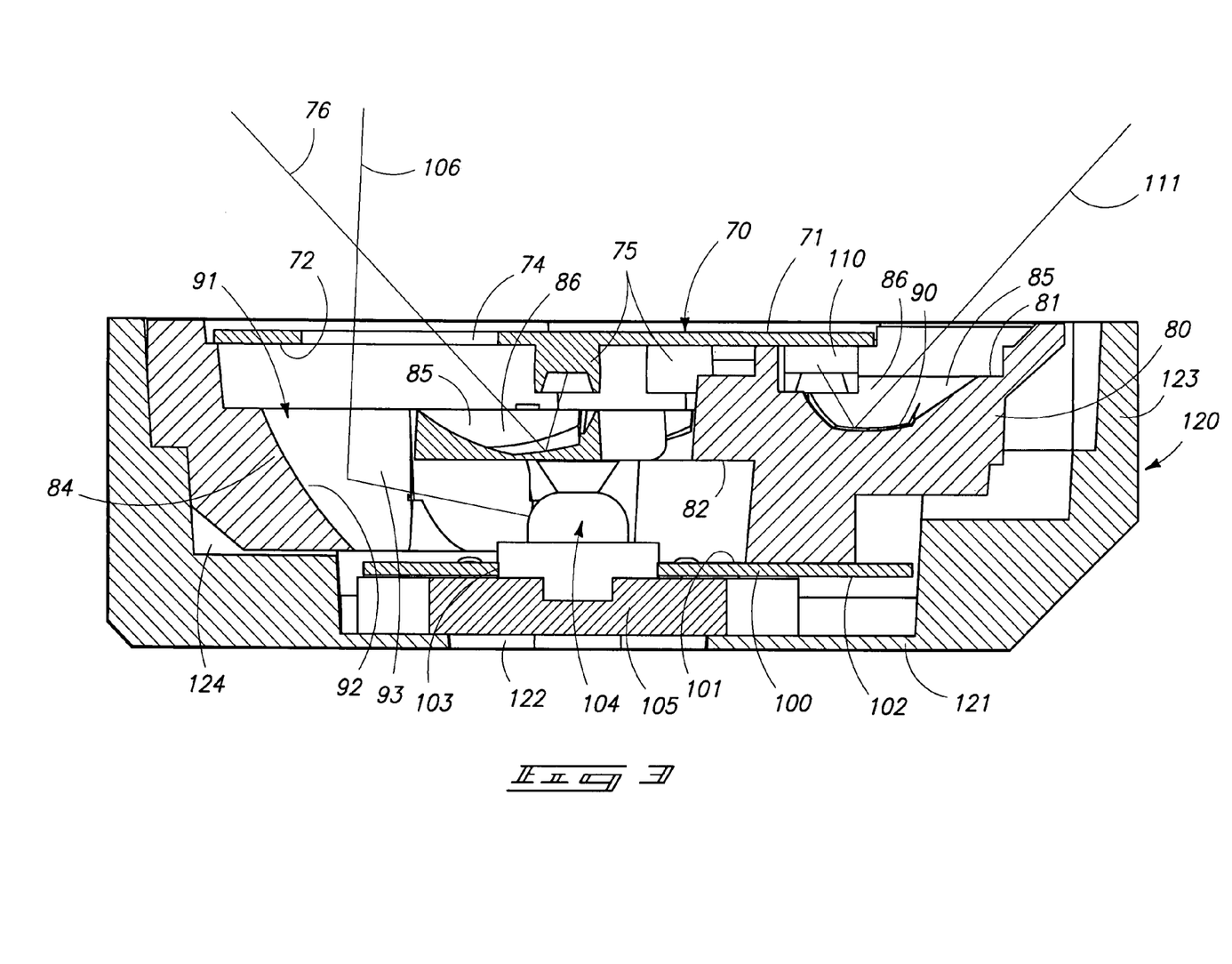
FIG. 3 is a transverse, vertical, sectional view of the electromagnetic radiation assembly of the present invention and which is taken from a position along line 3-3 of FIG. 2.
Figure 4:
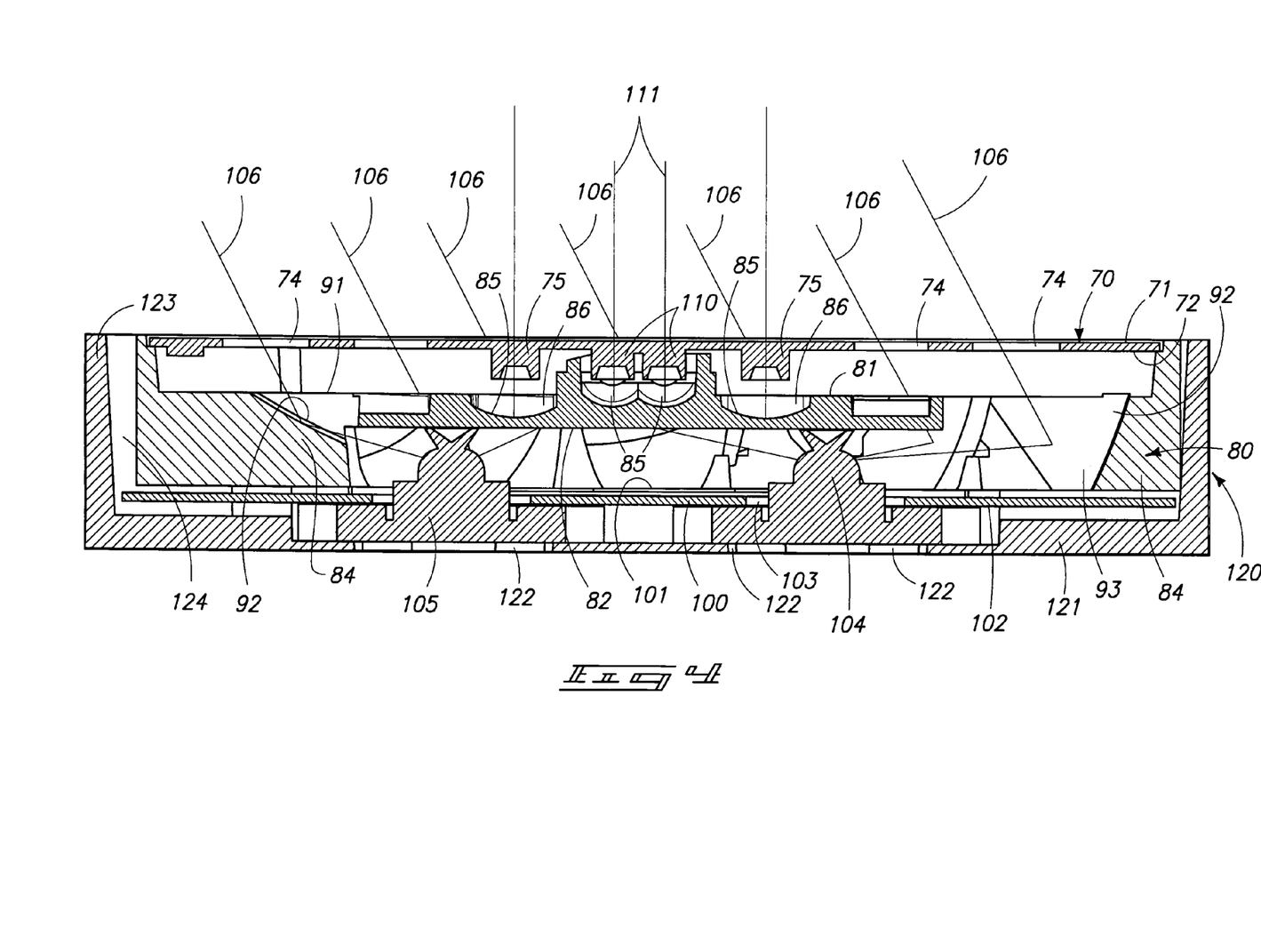
FIG. 4 is a longitudinal, vertical, sectional view of the electromagnetic radiation assembly of the present invention and which is taken from a position along line 4-4 of FIG. 2.

Referring now to FIGS. 1, 3 and 4, it will be seen that the assembly 10 of the present invention includes a reflector which is generally indicated by the numeral 80. The reflector can be fabricated by utilizing standard injection molding techniques, and post, reflective coating procedures. Alternatively, it may be pressure or vacuum formed from deformable sheets that have a highly reflective coating formed thereon. The reflector 80 has a first surface 81 which is positioned near the second surface 72 of the first opaque substrate 70; and a distinct second surface 82, as best seen by reference to FIG. 3. In the arrangement as shown in FIG. 4, it will be seen that the first opaque substrate 70 matingly cooperates with the reflector 80 such that the reflector 80 is juxtaposed, at least in part, relative to the semitransparent mirror or substrate 50. As seen by reference to FIG. 4, it will be understood that the first plurality of electromagnetic radiation emitters 75 are positioned near, but in spaced relation relative to, the first surface 81 of the reflector 80. As best understood by a study of FIGS. 1 and 3, respectively, the reflector 80 includes a first portion 83, and a second portion 84. The first portion 83 of the reflector 80 includes a plurality of individual reflector pockets 85 which define cavities 86. The individual reflector pockets 85 are typically positioned in substantially eccentric reflecting relation relative to the first plurality of electromagnetic radiation emitters 75. When energized, the respective reflector pockets individually reflect the visibly discernable electromagnetic radiation 76 emitted by the first plurality of electromagnetic radiation emitters 75 in a first direction, as illustrated, and into the illumination zone 31 as seen in FIG. 8A. As illustrated in the drawings, the respective reflector pockets 85 typically include multiple reflector facets which are generally indicated by the numeral 90. The respective reflector facets are operable to reflect the emitted visibly discernable electromagnetic radiation into the illumination zones as illustrated in FIGS. 8A-C, respectively during the various modes of operation of the invention. With respect to the second portion 84 of the reflector 80, it should be understood that the second portion 84 of the reflector 80 comprises, at least in part, an aperture 91 which extends through the reflector and which allows visibly discernable electromagnetic radiation generated by a second electromagnetic radiation emitter, which will be discussed below, to pass therethrough. The second portion 84 of the reflector further includes a reflector facet 92 having a reflecting surface 93 (FIG. 5) which is located adjacent to the aperture 91 and which is further positioned in spaced relation relative to the second surface 82 of the reflector 80 (FIG. 4), and oriented in reflecting relation relative to the second electromagnetic radiation emitter as will be described hereinafter. In the arrangement as seen in FIG. 3, it will be understood that visibly discernable electromagnetic radiation emitted by the second electromagnetic radiation emitter is reflected by the reflector facet 92 of the second portion 84, and in a second direction where it passes into the illumination zone 33 as seen in FIG. 8C. As should be noted, the visibly discernable electromagnetic radiation from both emitters is passed by the first region 61 of the semitransparent substrate 50, and viewed at locations forward of the first surface of the first substrate 70.

Referring now to FIGS. 1, 3, 4 and 5, it will be seen that the assembly 10 includes a second supporting substrate 100, and which is located in spaced relation relative to the first substantially opaque substrate 70. As illustrated, the reflector 80 is positioned therebetween the first and second substrates 70 and 100, respectively. As seen in the drawings, the second supporting substrate has a first surface 101 which rests, at least in part, in contact with the second surface 82 of the reflector 80, and a second surface 102. Still further, a plurality of apertures 103, as seen in FIG. 4, are formed in the second supporting substrate 100. Matingly received within, and disposed in an occluding relation relative to the apertures 103, are individual, second electromagnetic radiation emitters 104, here illustrated as side emitting, light emitting diodes. As depicted in FIG. 4, it should be understood that each of the second plurality of electromagnetic radiation emitters, here illustrated as side emitting, light emitting diodes 104, include a heat sink 105. As should be understood, during operation, and when energized, the second plurality of electromagnetic radiation emitters 104 generate heat energy. The arrangement, as shown in FIG. 4, allows the heat energy generated by the second plurality of electromagnetic radiation emitters 104 to be dissipated, at least in part, into the housing 40 and thereby prevent the undue buildup of heat energy in the assembly 10 which may cause a failure of the assembly 10 and/or the individual electromagnetic radiation emitters 104, as provided. When energized, the second plurality of electromagnetic radiation emitters 104 emits visibly discernable electromagnetic radiation 106 which is reflected by the second portion 84 of the reflector 80 along a course of travel to form the illumination zone 33 as seen in FIG. 8C. A portion of this second course of travel is in a different direction from that provided by the first electromagnetic radiation emitters 75. As best understood by a study of FIGS. 1, 2, and 4, the assembly 10 may include a third plurality of electromagnetic radiation emitters which are generally indicated by the numeral 110. This third plurality of electromagnetic radiation emitters 110 are mounted on the second surface 72 of the first substrate 70, and are electrically coupled to suitable electrical pathways which are borne by the second surface of the first substrate (not shown). As seen most clearly by reference to FIGS. 3 and 4, the third plurality of electromagnetic radiation emitters 110 are each individually associated with respective reflector pockets 85 and which are formed and otherwise oriented in a fashion so as to project the electromagnetic radiation 111 emitted by the third plurality of electromagnetic radiation into the illumination zone 32 as seen in FIG. 8B and in a third direction.

Referring now to FIG. 1 and following, it will be seen that the assembly 10 includes a housing which is generally indicated by the numeral 120. The housing is operable to receive, and partially enclose, in a somewhat nested arrangement, the various assemblies, discussed above. In this regard, the housing 120 includes a bottom portion 121. The bottom portion 121 includes a plurality of apertures 122, which are substantially coaxially aligned relative to the heat sinks 105 of the respective second plurality of electromagnetic radiation emitters 104. The apertures 122 further facilitates the dissipation of the heat energy generated during the energizing of the respective second electromagnetic radiation emitters into the housing 40, and which is mounted on the overland vehicle 11. Extending generally normally upwardly relative to the bottom portion 121 is a substantially continuous sidewall 123. The sidewall and bottom portion 121 define a cavity 124 which matingly and nestingly receives and otherwise operably cooperates with the assemblies described above. The housing 120 is itself, then matingly or otherwise mounted, along with the semitransparent mirror or substrate 50, to a mirror bezel (not shown) and which is received within the housing 40. In this fashion, the assembly 10 can be oriented in a proper position so as to be useful to the operator of an overland vehicle 11.

Figure 6:
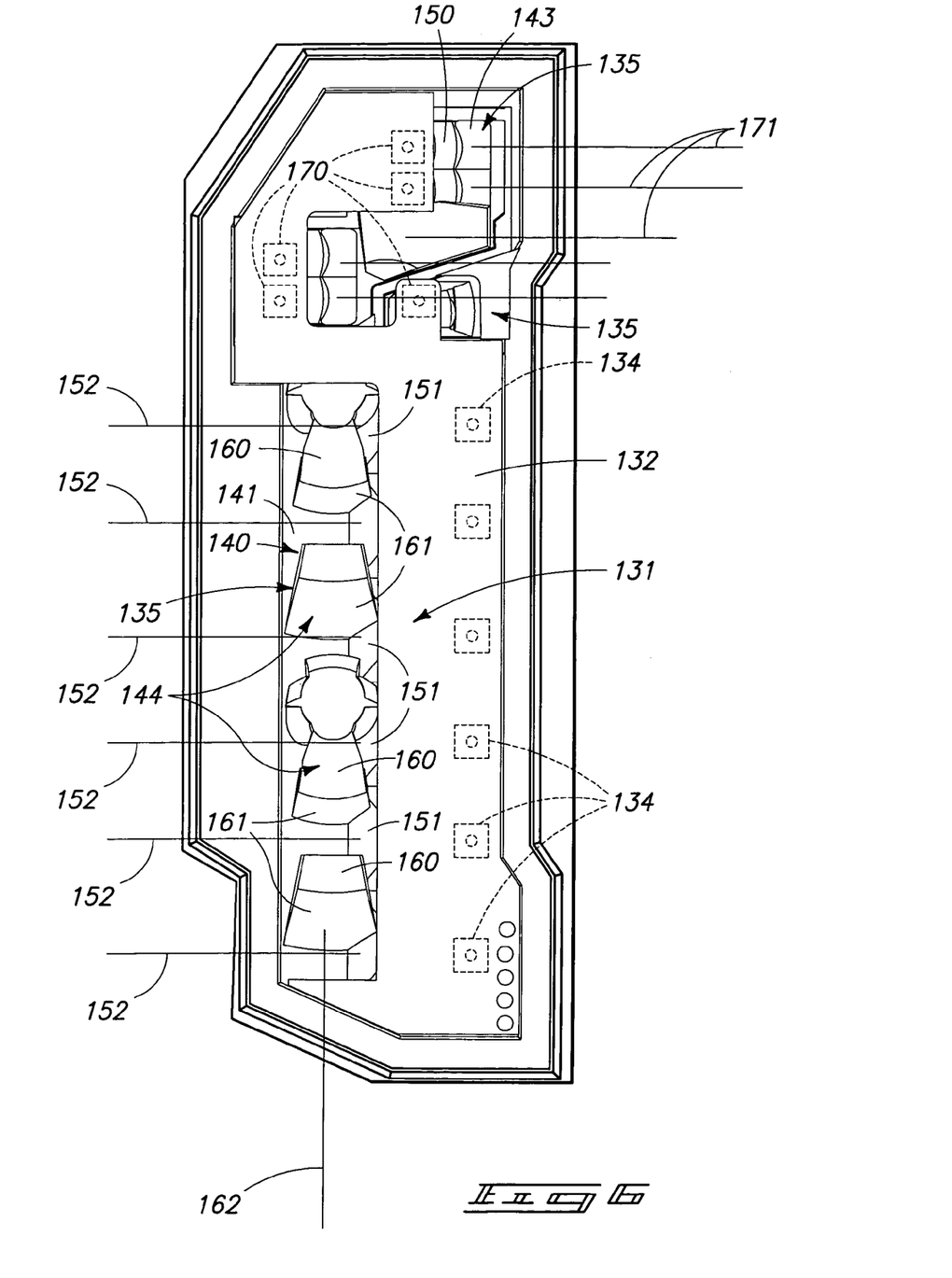
FIG. 6 is a partial, plan view of a second form of the electromagnetic radiation assembly of the present invention.

Referring now to FIG. 7, a second form of the invention is generally indicated by the numeral 130. As shown therein, the second form of the invention includes many features similar to that of the first form of the invention 10. Like structures in many instances have been shown and for those reasons bear similar numbers. In this regard, the semitransparent mirror or substrate 50, second substrate 100, and housing 120 are substantially identical to that described with respect to the first form of the invention, and therefore further discussion with respect to those structures is not warranted. The second form includes a first substrate 131 which has a different shape from that seen with respect to the first form as illustrated in FIG. 1. The first substrate 131 has a first surface 132, and a second surface 133. As seen, a first plurality of electromagnetic radiation emitters 134 are mounted on the second surface 133. Suitable electrical conduits are borne by the second surface and are coupled to a source of electricity which is typically supplied by the automotive platform 11. As should be understood by a study of FIG. 6, the first substrate, and housing 120, in combination and in the assembled form as seen in FIG. 6 defines discrete regions 135 through which emitted electromagnetic radiation, as described below, passes. This electromagnetic radiation is then passed by the semitransparent mirror or substrate 50 such that it forms a discrete signal which can be viewed at a distance from the assembly 130. As should be understood, and when assembled, the first surface 132 would be juxtaposed relative to the second surface 52 of the semitransparent substrate 50, and in the region 61.

As seen in FIG. 7, the second form of the invention 130 includes a reflector 140 which has a first surface 141, and a discrete, second surface 142. Still further, the reflector has a first portion 143 and a second portion 144. As seen in FIG. 7, the first portion 143 is defined by a plurality of individually discrete reflector pockets 150 which are somewhat similar in their overall function as that seen in the earlier form of the invention 10. In this regard, the plurality of reflector pockets 150 are defined by individual reflector facets 151 (FIG. 6), and are operable, as seen, to reflect the electromagnetic radiation 152 in various directions. As seen in FIG. 6, some of the plurality of reflector pockets 150 reflect the emitted electromagnetic radiation 152 in a first direction so as to be seen within the illumination zone 31 as seen in FIG. 8A. Further, the second portion 144 of the reflector 140 is defined, at least in part, by individual apertures 160 which are formed in the reflector 140. Still further, the second portion 144 includes individual reflector facets 161 which extend away from the first surface 141 and are positioned in reflecting relation relative to the second electromagnetic radiation emitters 104 and which are mounted on the second substrate 100. When energized, the electromagnetic radiation of the second plurality of electromagnetic radiation emitters 104 is reflected in a second direction as indicated by the line labeled 162. This electromagnetic radiation is then provided to the illumination zone 33 as seen in FIG. 8C.

In the second form of the invention 130, a third plurality of electromagnetic radiation emitters 170 is provided and which are mounted on the second surface 133 of the first substrate 131. When energized, the third plurality of electromagnetic radiation emitters are operable to provide electromagnetic radiation 171 which is reflected by individual reflector pockets 150 into the illumination zone 32 as seen in FIG. 8B. As seen in FIG. 6, where the second form of the invention 130 is shown in an assembled configuration, this assembled configuration is then received or otherwise mounted on a mirror bezel, (not shown), along with the semitransparent mirror or substrate 50 and thereafter oriented in an appropriate fashion so as to be useful to an operator of an overland vehicle 11.

OPERATION

The operation of the described embodiment of the present invention is believed to be readily apparent and is briefly summarized at this point.

Referring now to FIG. 1 and following, an electromagnetic radiation assembly 10 and 130 of the present invention includes a reflector 10 and 140 which has first and second surfaces 81, 82, 141, 142, and first and second portions 83, 84, 143, 144. Further, this assembly 10, 130 further includes a first electromagnetic radiation emitter 75, 134 positioned adjacent to the first surface, and which, when energized, emits visibly discernible electromagnetic radiation 76, 152 which is reflected by the first portion of the reflector so as to be visible at locations forward of the first surface; and a second electromagnetic radiation emitter 104, positioned adjacent to the second surface of the reflector, and which, when energized, emits visibly discernible electromagnetic radiation 162 which is reflected by the second portion of the reflector so as to be visible at locations forward of the first surface. The electromagnetic radiation assembly 10 of the present invention further includes a semitransparent mirror or substrate 50. The visibly discernable electromagnetic radiation emitted by the first and second electromagnetic radiation emitters 75, 104, 134 passes through the semitransparent mirror and can be seen at a distance, and in different directions, and typically within the illumination zones 31, 32 and 33, respectively.

With regards to the electromagnetic radiation assembly 10, the present invention includes a first substantially opaque substrate 70 positioned therebetween the semitransparent mirror or substrate 50 and the reflector 80. The first opaque substrate defines a region 73 through which the visibly discernable electromagnetic radiation may pass. With regard to the first and second forms of the invention 10 and 130, the first electromagnetic radiation emitter 75, 134 is mounted on the first opaque substrate 70, 131 and near the region which passes the visibly discernable electromagnetic radiation. The electromagnetic radiation assembly 10 and 130 of the present invention further includes a second substrate 100 which is positioned in spaced relation relative to the second surface 82, 142 of the reflector 80, 140. In this regard, the reflector is located therebetween the first substrate 70, 131 and the second substrate 100, and the second electromagnetic radiation assembly 104 is mounted on the second substrate 100. With regards to the first and second forms of the invention, the first portion 83, 143 of the reflector 80, 140 comprises, at least in part, a reflector pocket 85, 150 having multiple reflector facets. The respective reflective pockets each define a cavity 86 which is typically positioned in eccentric, reflecting relation relative to the first electromagnetic radiation emitters 75, 134. The respective reflector pockets reflects the emitted visibly discernable electromagnetic radiation emitted by the first electromagnetic radiation emitter 75, 134 in a first direction as illustrated in the drawings. In the arrangement as seen, the second portion 84 of the reflector 80, 140 comprise, at least in part, an aperture 91, 160 which allows the visibly discernable electromagnetic radiation generated by the second electromagnetic radiation emitter 104 to pass therethrough. The second portion includes a reflector facet 92, 161 having a reflecting surface which is located adjacent to the aperture and which is further positioned in spaced relation relative to the second surface 82, 142 of the reflector 80, 140, and in reflecting relation relative to the second electromagnetic radiation emitter 104. Visibly discernable electromagnetic radiation emitted by the second electromagnetic radiation emitter 104 is reflected by the reflector facet of the second portion of the reflector in the second direction. In the arrangement as seen, a third electromagnetic radiation emitter 110, 170 is mounted on the second surface 72, 133 of the first substrate 70, 100, and wherein the electromagnetic radiation generated by the third electromagnetic radiation emitter is reflected by one of the reflector facets in a third direction. When assembled, and as seen in the drawings, the emitted visibly discernable electromagnetic radiation is operable to pass through the semitransparent substrate or mirror 50, and pass into first, second and third illumination zones 31, 32, and 33, respectively so as to be useful to the operator of the overland vehicle 11, or other vehicles traveling adjacent thereto.

Therefore, it will be seen that the electromagnetic radiation assembly 10, 130 of the present invention provides many advantages over the prior art devices which have been utilized heretofore. As will be recognized, the present assembly 10 and 130 is compact, cost efficient, and further provides a convenient means whereby discernable electromagnetic radiation may be projected in various directions and patterns relative to the overland vehicle to assist the operator in the use of the overland vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electromagnetic radiation assembly, comprising:
   a reflector having distinct first and second surfaces, and first and second portions;
   a first electromagnetic radiation emitter positioned adjacent to the first surface, and which, when energized, emits visibly discernible electromagnetic radiation which is reflected by the first portion of the reflector so as to be visible at locations forward of the first surface; and
   a second electromagnetic radiation emitter positioned adjacent to the second surface of the reflector, and which, when energized, emits visibly discernible electromagnetic radiation which is reflected by the second portion of the reflector so as to be visible at locations forward of the first surface.

2. An electromagnetic radiation assembly as claimed in claim 1, and further comprising:
   a semitransparent substrate juxtaposed relative to the reflector, and wherein the visibly discernible electromagnetic radiation emitted by the first and second electromagnetic radiation emitters passes through the semitransparent substrate.

3. An electromagnetic radiation assembly as claimed in claim 1, and further comprising:
   a semitransparent substrate positioned near the reflector, and which passes the emitted visibly discernible electromagnetic radiation; and
   a first substantially opaque substrate positioned therebetween the semitransparent substrate and the reflector, and wherein the opaque substrate defines, at least in part, a region through which the visibly discernible electromagnetic radiation may pass, and wherein the first electromagnetic radiation emitter is mounted on the first substantially opaque substrate and near the region which passes the visibly discernible electromagnetic radiation.

4. An electromagnetic radiation assembly as claimed in claim 3, and wherein the semitransparent substrate has a first outside facing surface, and a second inside facing surface, and wherein the first substantially opaque substrate has a first surface which is juxtaposed relative to the second, inside facing surface of the mirror, and a second surface, and wherein the first electromagnetic radiation emitter is mounted on the second surface thereof, and wherein the first surface of the reflector is positioned adjacent to the second surface of the first substrate.

5. An electromagnetic radiation assembly as claimed in claim 3, and further comprising:
   a second substrate positioned in spaced relation relative to the second surface of the reflector, and wherein the reflector is located therebetween the first substrate, and the second substrate, and wherein the second substrate has a first surface, and a second surface, and wherein the second electromagnetic radiation assembly is mounted on the second substrate.

6. An electromagnetic radiation assembly as claimed in claim 1, and wherein the first portion of the reflector comprises, at least in part, a reflector pocket, and wherein the reflector pocket defines a cavity which is positioned in eccentric reflecting relation relative to the first electromagnetic radiation emitter, and wherein the reflector pocket reflects the visibly discernible electromagnetic radiation emitted by the first electromagnetic radiation emitter in a first direction.

7. An electromagnetic radiation assembly as claimed in claim 6, and wherein the second portion of the reflector comprises, at least in part, an aperture which allows the visibly discernible electromagnetic radiation generated by the second electromagnetic radiation to pass therethrough; and a reflector facet, having a reflecting surface, is located adjacent to the aperture, and which is further positioned in spaced relation relative to the second surface of the reflector, and disposed in reflecting relation relative to the second electromagnetic radiation emitter, and wherein the visibly discernible electromagnetic radiation emitted by the second electromagnetic radiation emitter is reflected by the reflector facet of the second portion of the reflector in a second direction.

8. An electromagnetic radiation assembly as claimed in claim 7, and further comprising:
   a third electromagnetic radiation emitter positioned adjacent to the first surface of the reflector, and which, when energized, emits visibly discernible electromagnetic radiation which is reflected, at least in part, by the first portion of the reflector in a third direction.

9. An electromagnetic radiation assembly as claimed in claim 8, and further comprising:
   a housing borne on an overland and which defines an internal cavity, and wherein the housing further defines an aperture which allows access to the internal cavity thereof, and wherein the reflector, and the first and second electromagnetic radiation emitters are received in the cavity of the housing;
   a semitransparent substrate borne by the housing, and which is positioned in substantially occluding relation relative to the aperture of the housing, and wherein the semitransparent substrate has a first outwardly facing surface, and an opposite, inwardly facing surface, and wherein the first surface of the reflector is positioned near the second inwardly facing surface of the semitransparent substrate, and wherein the semitransparent substrate passes the visibly discernible light emitted by the first, second and third electromagnetic radiation emitters, and wherein the visibly discernible light which is traveling in the first direction is oriented substantially laterally outwardly relative to a direction of travel of the overland vehicle, and wherein the visibly discernible light which is traveling in the second direction is oriented substantially downwardly relative to a direction of travel of the overland vehicle, and wherein the visibly discernible light which is traveling in the third direction is oriented substantially laterally inwardly relative to a direction of travel of the overland vehicle.

10. An electromagnetic radiation assembly as claimed in claim 9, and wherein the semitransparent substrate is a semitransparent mirror which is selected from the group comprising substantially neutrally chromatic, dichroic, and electrochromic mirrors.

* * * * *